(12) United States Patent
Makifuchi et al.

(10) Patent No.: US 7,248,040 B2
(45) Date of Patent: Jul. 24, 2007

(54) DISK TESTING APPARATUS, DISK TESTING METHOD, COMPUTER-READABLE RECORDING MEDIUM THAT STORES A DISK TESTING PROGRAM, AND DISK APPARATUS INCLUDING A DISK TO BE TESTED

(75) Inventors: Masaki Makifuchi, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 11/022,607

(22) Filed: Dec. 27, 2004

(65) Prior Publication Data
US 2006/0061356 A1 Mar. 23, 2006

(30) Foreign Application Priority Data
Sep. 17, 2004 (JP) ............................. 2004-271626

(51) Int. Cl.
*G01R 33/12* (2006.01)
(52) U.S. Cl. ...................................... 324/212
(58) Field of Classification Search ............... 360/31
See application file for complete search history.

(56) References Cited

U.S. PATENT DOCUMENTS

| | | | |
|---|---|---|---|
| 5,777,964 A | 7/1998 | Furuta et al. | |
| 5,835,299 A * | 11/1998 | Lee et al. | 360/76 |
| 5,920,534 A | 7/1999 | Furuta et al. | |
| 5,943,640 A | 8/1999 | MacPherson | |
| 6,088,664 A | 7/2000 | MacPherson | |
| 6,115,350 A | 9/2000 | Furuta et al. | |
| 6,545,832 B1 | 4/2003 | Sugawara et al. | |
| 6,633,442 B2 * | 10/2003 | Quak et al. | 360/31 |
| 6,757,119 B2 * | 6/2004 | Leow et al. | 360/31 |
| 6,957,379 B1 * | 10/2005 | Patapoutian et al. | 714/774 |

FOREIGN PATENT DOCUMENTS

| | | |
|---|---|---|
| JP | 9-171663 | 6/1997 |
| JP | 11-514480 | 12/1999 |
| JP | 2000-123498 | 4/2000 |
| JP | 2003-028930 | 1/2003 |
| JP | 2004-071061 | 4/2004 |

* cited by examiner

Primary Examiner—Jay M. Patidar
(74) Attorney, Agent, or Firm—Greer, Burns & Crain, Ltd.

(57) ABSTRACT

A disk testing apparatus that sets a predetermined condition of a recording density for a disk apparatus, and conducts a test relating to at least readout of data stored in the disk apparatus includes a condition relaxing unit that relaxes, when a result of the test is unsatisfactory, a condition of the recording density currently set for the disk apparatus to set a new condition of the recording density; and a re-testing unit that re-conducts the test on the disk apparatus to which the new condition is set.

7 Claims, 8 Drawing Sheets

FIG.5

| | [TEST ITEM] | [TEMPERATURE] | [VOLTAGE] | [DETAIL] | RE-TEST |
|---|---|---|---|---|---|
| 1) | INPUT FORMAT CONDITION FOR DEVICE SPECIFICATIONS | NORMAL TEMPERATURE | NORMAL | INPUT TESTING CONDITION SUCH AS FORMAT (BPI/TPI) FOR DEVICE | |
| 2) | TUNING 1 | NORMAL TEMPERATURE | NORMAL | TUNE DEVICE INDEPENDENTLY | NOT CONDUCTED |
| 3) | OSCILLATION SELECTING TEST 1 | NORMAL TEMPERATURE | NORMAL | EXAMINE WHETHER THERE IS OSCILLATION (NORMAL TEMPERATURE) | |
| 4) | ERROR RATE TEST 1 | NORMAL TEMPERATURE | NORMAL | MEASURE ERROR RATE (NORMAL TEMPERATURE/5.0 V) | |
| 5) | TUNING 2 | HIGH TEMPERATURE | NORMAL | TUNE DEVICE INDEPENDENTLY (HIGH TEMPERATURE) | |
| 6) | REGISTER DEFECT | HIGH TEMPERATURE | NORMAL | REGISTER DEFECT | |
| 7) | EROR RATE TEST 2 | HIGH TEMPERATURE | NORMAL | MEASURE ERROR RATE (HIGH TEMPERATURE/5.0 V) | |
| 8) | SIDE ERASE TEST 1 | HIGH TEMPERATURE | NORMAL | MEASURE INFLUENCE OF SIDE ERASE (HIGH TEMPERATURE) | NOT CONDUCTED |
| 9) | OSCILLATION SELECTING TEST 2 | HIGH TEMPERATURE | NORMAL | EXAMINE WHETHER THERE IS OSCILLATION (HIGH TEMPERATURE) | |
| 10) | ERROR RATE TEST 3 | HIGH TEMPERATURE | LOW | MEASURE ERROR RATE (HIGH TEMPERATURE/4.7 V) | |
| 11) | WRITE/READ TEST 1 | HIGH TEMPERATURE | LOW | WRITE/READ TEST (HIGH TEMPERATURE) | |
| 12) | WRITE/READ TEST 2 | HIGH TEMPERATURE | HIGH | WRITE/READ TEST (HIGH TEMPERATURE≧NORMAL TEMPERATURE) | |
| 13) | SIDE ERASE TEST 2 | HIGH TEMPERATURE→NORMAL TEMPERATURE | LOW | MEASURE INFLUENCE OF SIDE ERASE (NORMAL TEMPERATURE) | NOT CONDUCTED |
| 14) | LOAD/UNLOAD TEST | NORMAL TEMPERATURE | LOW | TEST LOAD/UNLOAD ACTION OF HEAD | |
| 15) | WRITE/READ TEST 3 | NORMAL TEMPERATURE | LOW | WRITE/READ TEST (NORMAL TEMPERATURE) | NOT CONDUCTED |
| 16) | ERROR RATE TEST 4 | NORMAL TEMPERATURE | LOW | MEASURE ERROR RATE (LOW TEMPERATURE/4.7 V) | |
| 17) | TUNING 3 | LOW TEMPERATURE | NORMAL | TUNE DEVICE INDEPENDENTLY (LOW TEMPERATURE) | |
| 18) | POWER ON/OFF TEST 1 | LOW TEMPERATURE | LOW/NORMAL/HIGH | MEASURE TIME REQUIRED TO START DEVICE WITH EACH VOLTAGE (4.7 V/5.0 V/5.3 V) | NOT CONDUCTED |
| 19) | ERROR RATE TEST 4 | LOW TEMPERATURE | NORMAL | MEASURE ERROR RATE (LOW TEMPERATURE/5.0 V) | |
| 20) | WRITE/READ TEST 4 | LOW TEMPERATURE | LOW/NORMAL/HIGH | WRITE/READ TEST (LOW TEMPERATURE) | |
| 21) | WRITE/READ TEST 5 | LOW TEMPERATURE→HIGH TEMPERATURE | NORMAL | WRITE/READ TEST (LOW TEMPERATURE≧HIGH TEMPERATURE) | |
| 22) | POWER ON/OFF TEST 2 | HIGH TEMPERATURE | LOW/NORMAL/HIGH | MEASURE TIME REQUIRED TO START DEVICE WITH EACH VOLTAGE (4.7 V/5.0 V/5.3 V) | NOT CONDUCTED |
| 23) | WRITE/READ TEST 6 | HIGH TEMPERATURE | LOW/NORMAL/HIGH | WRITE/READ TEST (HIGH TEMPERATURE) | |
| 24) | WRITE/READ TEST 7 | HIGH TEMPERATURE→NORMAL TEMPERATURE | NORMAL | WRITE/READ TEST (HIGH TEMPERATURE≧NORMAL TEMPERATURE) | |
| 25) | POWER ON/OFF TEST 3 | NORMAL TEMPERATURE | LOW/NORMAL/HIGH | MEASURE TIME REQUIRED TO START DEVICE WITH EACH VOLTAGE (4.7 V/5.0 V/5.3 V) | NOT CONDUCTED |
| 26) | WRITE/READ TEST 8 | NORMAL TEMPERATURE | LOW/NORMAL/HIGH | WRITE/READ TEST (NORMAL TEMPERATURE) | |

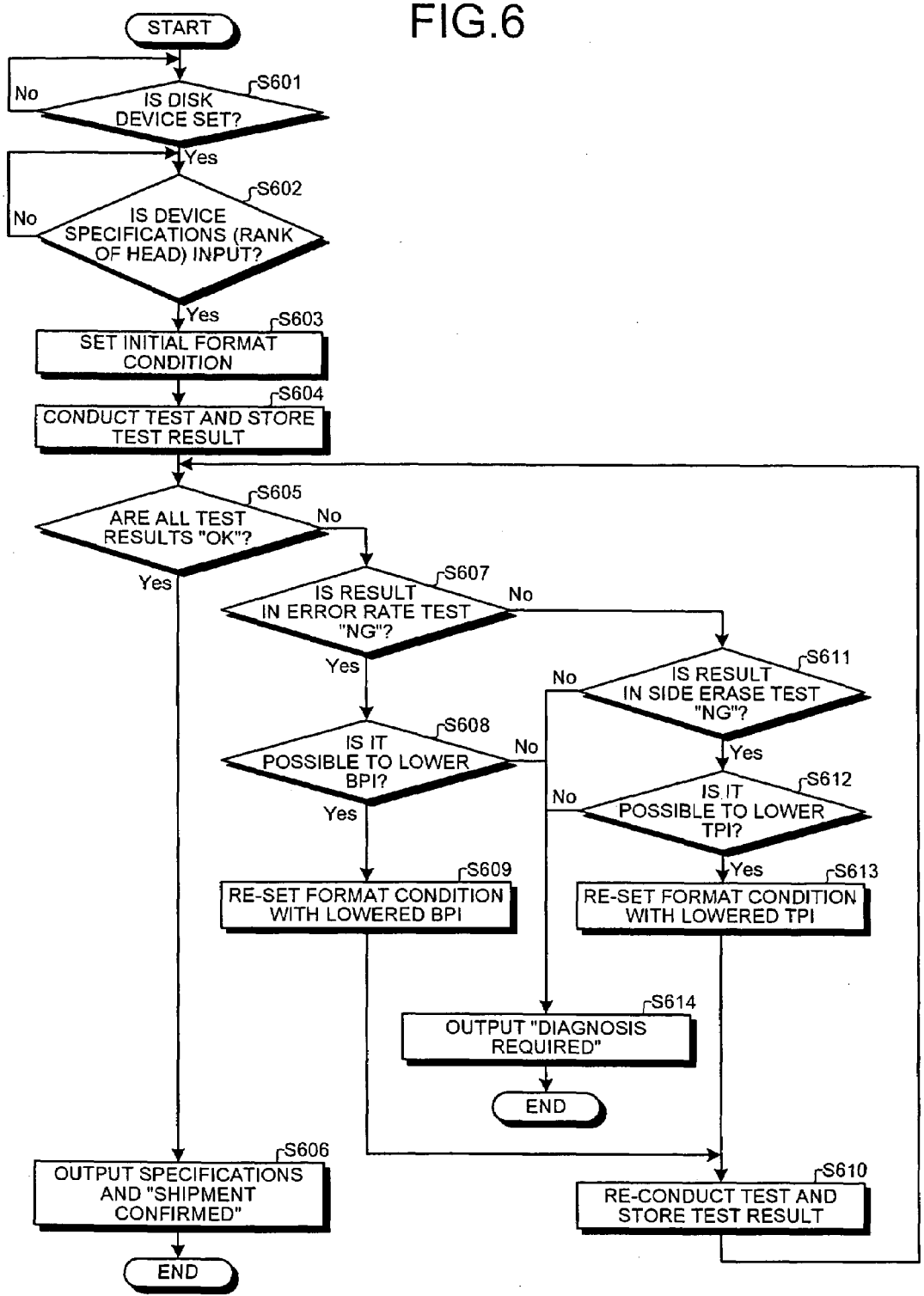

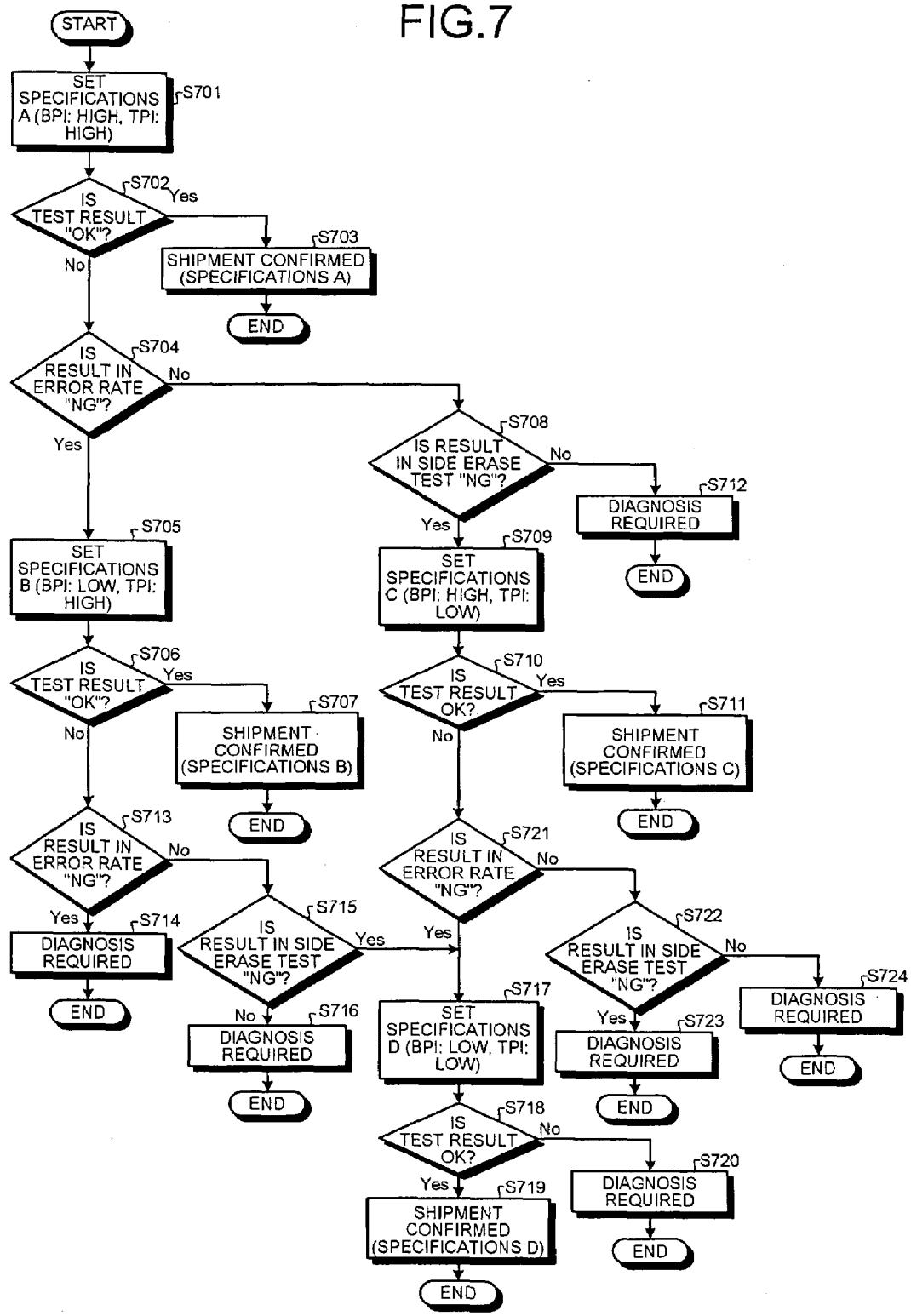

FIG.8

| DEVICE SPECIFICATIONS | A | B | C | D | E | F | G | H | I |
|---|---|---|---|---|---|---|---|---|---|
| BPI | HIGH | MEDIUM | LOW | HIGH | HIGH | MEDIUM | LOW | MEDIUM | LOW |
| TPI | HIGH | HIGH | HIGH | MEDIUM | LOW | MEDIUM | MEDIUM | LOW | LOW |

FORMAT-CONDITION STORAGE UNIT

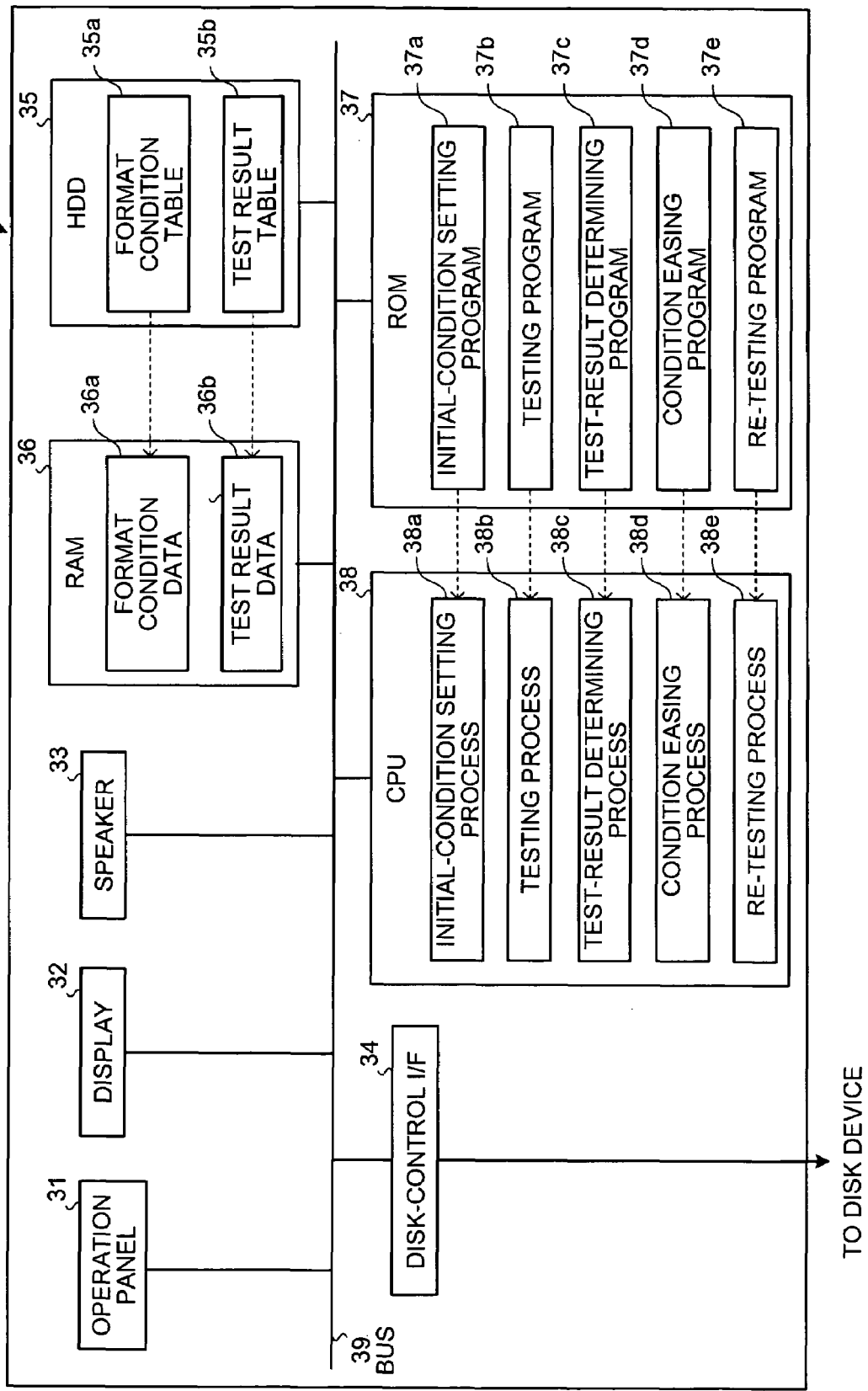

DISK TESTING APPARATUS, DISK TESTING METHOD, COMPUTER-READABLE RECORDING MEDIUM THAT STORES A DISK TESTING PROGRAM, AND DISK APPARATUS INCLUDING A DISK TO BE TESTED

BACKGROUND OF THE INVENTION

1. Field of the Invention

The present invention relates to a disk testing apparatus, a disk testing method, a computer product, and a disk apparatus, and more particularly, to a disk testing apparatus, a disk testing method, a computer product for conducting a test on a disk apparatus while setting a predetermined condition of a recording density, and a disk apparatus tested by the above apparatus and method.

2. Description of the Related Art

Conventionally, a various kinds of tests are conducted on a magnetic disk apparatus before shipment. Technologies for such tests are disclosed in, for example, Japanese Patent Application Laid-Open Publication No. 2004-071061 and PCT Application Laid-Open Publication No. H11-514480. Generally, a head test is conducted on each head for the magnetic disk to rank the head according to specifications (a format condition such as a linear recording density and a track density) of a disk apparatus. A head ranked high is installed in a disk apparatus for which a format condition with high density is set. A head ranked low is installed in a disk apparatus for which a format condition with low density is set. Then, based on each of the format conditions set for the disk apparatus, test relating to readout of data, such as an error rate test and a side erase test, is conducted on the disk apparatus.

In the error rate test, the readout of data stored in a disk of the disk apparatus is tested for a plurality of times to determine an error rate, which is a probability of error in the readout. In the side erase test, the error rate when writing is conducted into a part adjacent to a part at which the data to be read is stored in the disk is determined by testing the readout of the data before and after the writing. Alternatively, another detection function that is included in a read channel (RDC) such as a Viterbi metric margin (VMM), which is a rate of erroneously selecting a value other than an optimal value determined in a Viterbi method, expressed numerically), may be used instead of the error rate.

Testing environment is different for the head and for the disk apparatus. For example, while the head test is conducted at room temperature, the test for the disk apparatus is conducted in a wide range of temperature from low to high. Moreover, while assembling the disk apparatus with the head and the disk, the head may be damaged, resulting change in a quality (rank) of the head. If the quality of the head changes, the head is often determined faulty in the test due to unsuccessful results in the error rate test and the side erase test, even though the disk apparatus is assembled depending on the rank initially determined for the head. When the head is determined faulty in the disk apparatus, the head is removed from the disk apparatus and re-assembled for a disk apparatus that is suitable for the rank of the head determined faulty. Then, a same process of the error rate test and the side erase test is repeated under a same format condition as the test conducted previously.

However, in the above conventional technologies, the head may be unnecessarily discarded. Moreover, an extra time and labor is spent on the test before shipment.

Specifically, in the above conventional technologies, the head determined faulty is removed from the disk apparatus to be discarded although even such head may pass the error rate test and the side erase test, if the head is used in a disk apparatus for which a format condition with a low density is set. In other words, the head is discarded unnecessarily, and this increases manufacturing cost of the disk apparatus.

Furthermore, in the above conventional technologies, if results of the error rate test and the side erase test are unsuccessful, the test is repeated on the disk apparatus after re-assembling the disk apparatus with a replaced head. Therefore, extra time and labor is spent on the test before shipment, hindering mass production of the disk apparatus.

SUMMARY OF THE INVENTION

It is an object of the present invention to solve at least the above problems in the conventional technology.

A disk testing apparatus according to one aspect of the present invention, which sets a predetermined condition of a recording density for a disk apparatus, and conducts a test relating to at least readout of data stored in the disk apparatus, includes a condition relaxing unit that relaxes, when a result of the test is unsatisfactory, a condition of the recording density currently set for the disk apparatus to set a new condition of the recording density; and a re-testing unit that re-conducts the test on the disk apparatus to which the new condition is set.

A disk testing method according to another aspect of the present invention, which is for setting a predetermined condition of a recording density for a disk apparatus, and conducting a test relating to at least readout of data stored in the disk apparatus, includes setting initially the predetermined condition of the recording density for the disk apparatus; conducting the test on the disk apparatus to which the predetermined condition is set; relaxing, when a result of the test is unsatisfactory, a condition of the recording density currently set for the disk apparatus to set a new condition of the recording density; and re-conducting the test on the disk apparatus to which the new condition is set.

A computer-readable recording medium according to still another aspect of the present invention stores a disk testing program that makes a computer execute relaxing, when a result of the test is unsatisfactory, a condition of the recording density currently set for the disk apparatus to set a new condition of the recording density; and re-conducting the test on the disk apparatus to which the new condition is set.

A disk apparatus according to still another aspect of the present invention is taken a test relating to at least readout of data stored in the disk apparatus is conducted under a predetermined condition of a recording density set for the disk apparatus. When a result of the test is unsatisfactory, a condition of the recording density currently set for the disk apparatus is relaxed to set a new condition of the recording density. The test is re-conducted on the disk apparatus under the new condition.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a table of test details;

FIG. 6 is a flowchart of a disk test according to the first embodiment;

FIG. 7 is a flowchart of the disk test in a specific example according to the first embodiment;

FIG. 8 is a table of the information that is stored in the format-condition storage unit; and FIG. 9 is a block diagram of a computer on which a disk testing program is executed.

DETAILED DESCRIPTION

Exemplary embodiments of a disk testing apparatus, a disk testing method, a computer product, and a disk apparatus according to the present invention are explained in detail with reference to the accompanying drawings.

Figures 3, 4:
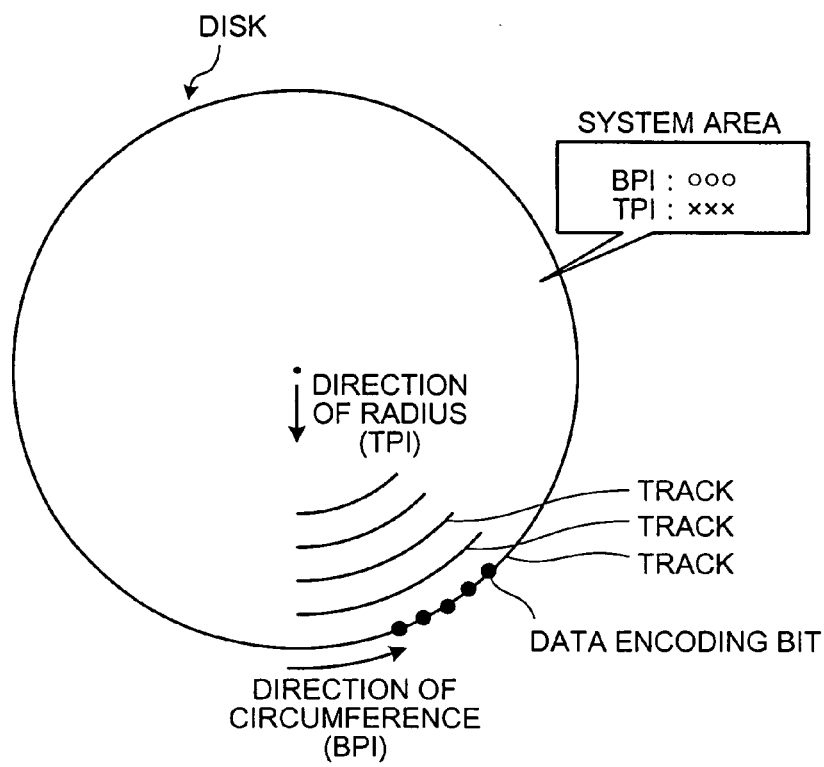
FIG. 3 is a schematic diagram for explaining a bit per inch (BPI) and a track per inch (TPI)
FIG. 4 is a table of information that is stored in a format-condition storage unit.

FIG. 3 is a schematic diagram for explaining a BPI and a TPI. The "BPI", which corresponds to a "condition of a recording density in a direction of circumference" in the appended claims, signifies the linear recording density. As shown in FIG. 3, the linear recording density is expressed in an amount of bits packed in a length of one inch on one track in the direction of circumference of a disk.

The "TPI", which corresponds to a "condition of a recording density in a direction of a radius" in the appended claims, signifies the track density. As shown in FIG. 3, the track density is express in an amount of tracks placed within a length of one inch in the direction (from a center of a platter to a rim of the platter) of radius of the disk.

The "error rate test", which corresponds to a "test relating to readout" in the appended claims, signifies a test to determine a probability (error rate) of error in the readout of data. The error rate is determined by testing the readout of data stored in the disk for a plurality of times. If a value of the error rate exceeds a predetermined threshold value, a test result is determined to be unsatisfactory. A detecting function that is included in the RDC such as "VMM" may be used instead of the "error rate".

A "side erase" is a phenomenon in which a recorded condition (magnetization) of data stored in the disk becomes poor being influenced by writing of new data into a part of the disk adjacent to a part at which the data is recorded. In the "side erase test", a test to determine the error rate is conducted before and after writing. The writing is executed for a plurality of times to the part of the disk adjacent to the part at which the data to be read is stored. If a value of difference between the error rates before and after the writing exceeds a predetermined threshold value, a test result is determined to be unsatisfactory. The test result may be determined to be unsatisfactory also when only the value of the error rate after the writing exceeds the predetermined threshold value.

A disk apparatus to be explained below rewritably stores the BPI and the TPI in a system area as the format condition. In a disk apparatus according to a first embodiment, the format condition is set by writing the BPI and the TPI in the system area at when the test is to be conducted on the disk apparatus. With a firmware, with which read and write of data are executed, the BPI and the TPI are read, and then the read or the write of data is executed according to the BPI and the TPI. In an explanation below, changing a required condition of the recording density (the BPI and the TPI) from high density to low density is referred as "relaxing".

Figure 2:
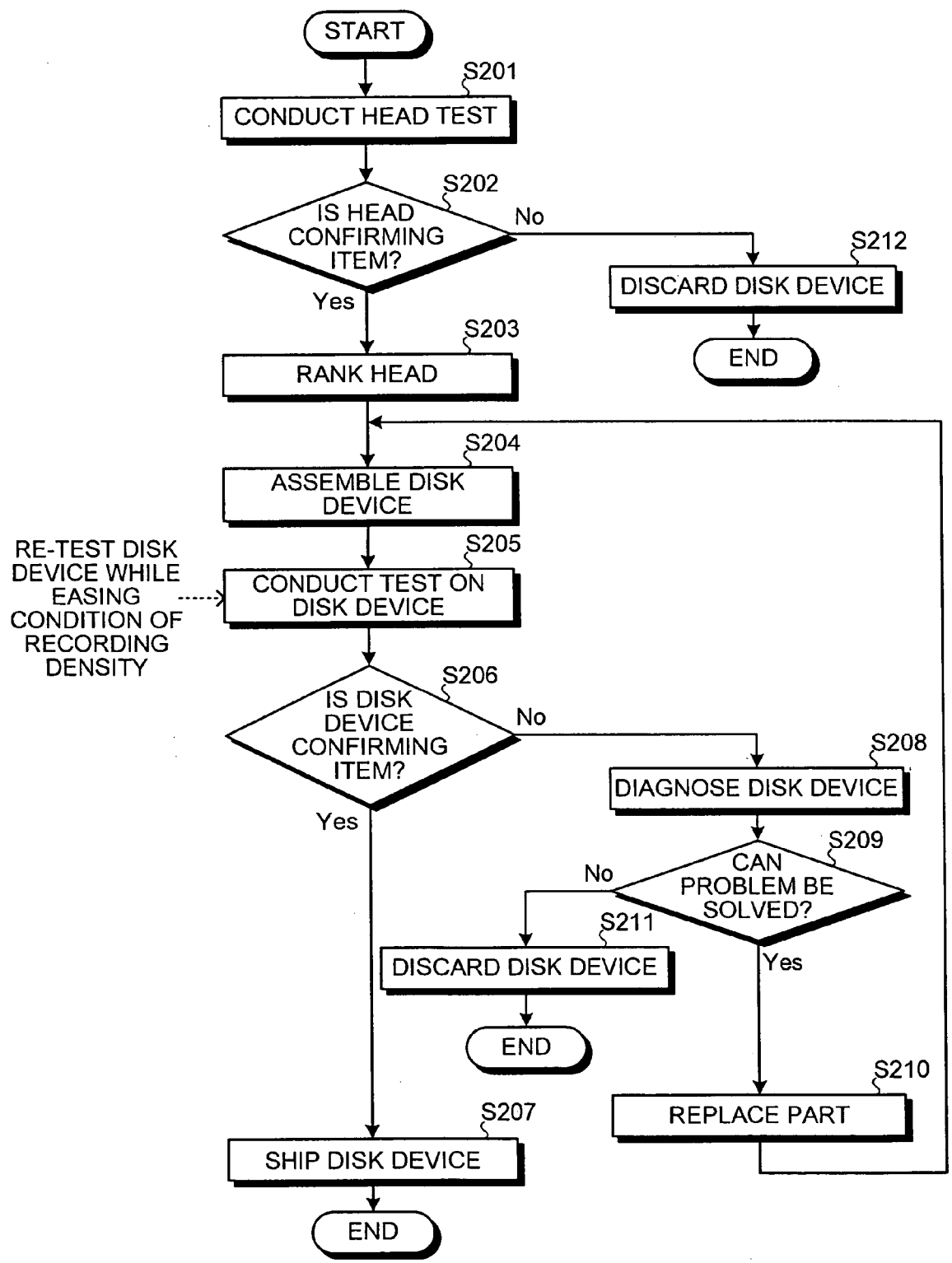
FIG. 2 is a flowchart of a process from a head test to shipment.

FIG. 2 is a flowchart of a process from a head test to shipment. As shown in FIG. 2, a head test is conducted on a head selected from among a plurality of the heads having same specifications (same products) by a head testing apparatus for conducting the head test to determine accuracy of reading data (step S201). A head determined as a defective based on a result of the head test ("NO" at step S202) is discarded without being installed in the disk apparatus (step S212).

On the other hand, a head determined as a confirming item ("YES" at step S202) is ranked depending on the accuracy of reading data (step S203). Specifically, the head is ranked according to specifications (format condition including the BPI and the TPI) of the disk apparatus. For example, the head is ranked in one of head ranks A, B, C, and D in a decreasing order of the accuracy as shown in FIG. 4. Ranking of the head is carried out to arrange the head in a suitable disk apparatus. In other words, the head with high accuracy of reading data is used in a disk apparatus for which a high recording density (the BPI and the TPI) is set, and the head with low accuracy of reading data is used in a disk apparatus for which a low recording density is set.

Figure 1:
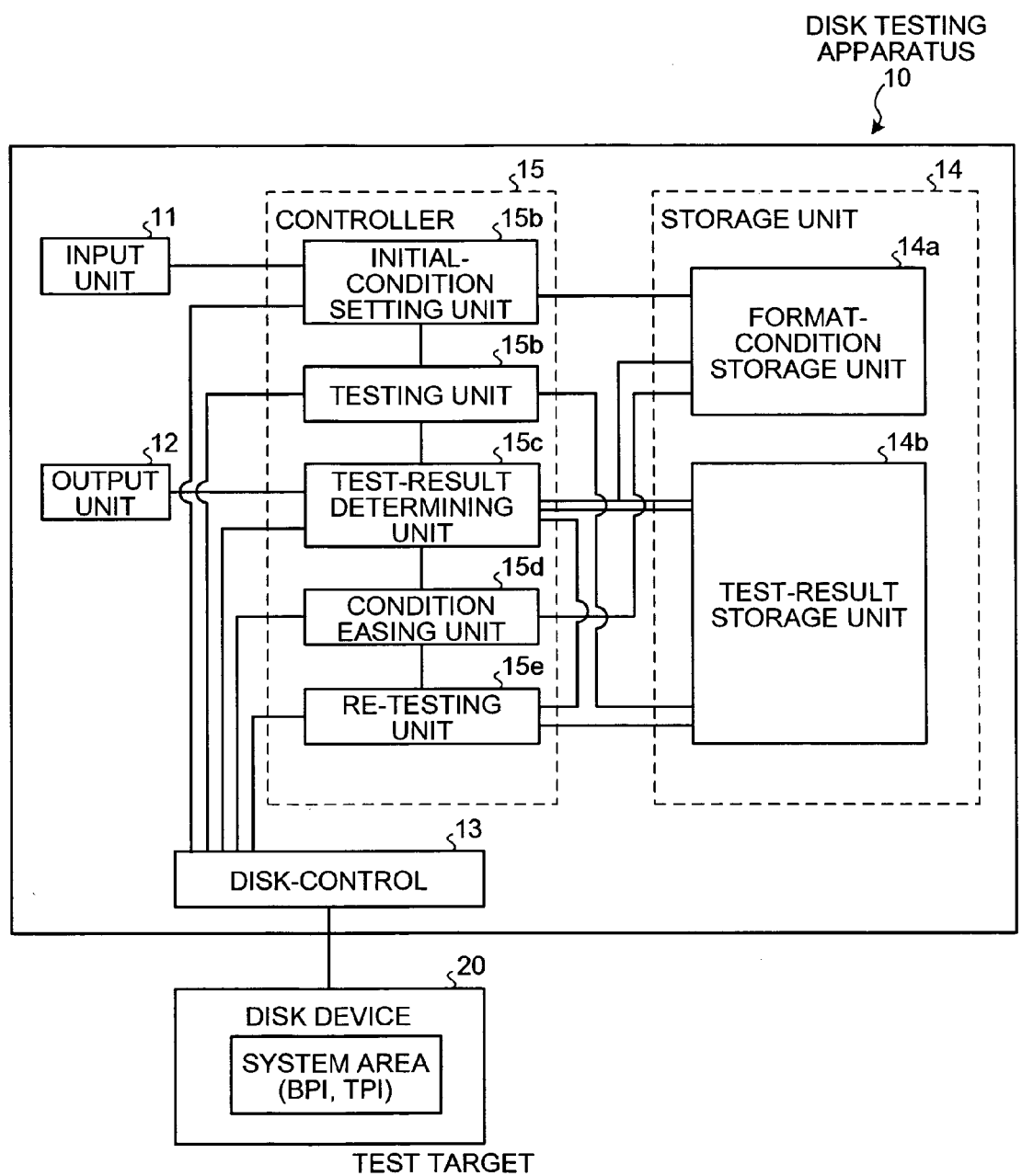
FIG. 1 is a block diagram of a configuration of a disk testing apparatus according to a first embodiment of the present invention.

Then, the disk apparatus is assembled with the head, a disk, and the like (step S204). The disk apparatus assembled is connected to the disk testing apparatus as shown in FIG. 1, and is tested by the disk testing apparatus (step S205).

The disk testing apparatus is to conduct a test on the disk apparatus with setting a predetermined format condition (the BPI and the TPI). The test includes the error rate test and the side erase test. Main features of the disk testing apparatus are it is possible to prevent the head from being unnecessarily discarded, and that it is possible to reduce time and labor spent on the test.

First, the format condition (see FIG. 4) that corresponds to the rank of the head is set for the disk testing apparatus, and then, a disk test (see FIG. 5) that includes the error rate test and the side erase test are conducted. If the test result is unsatisfactory under the format condition initially set, the format condition is eased. Then, the test is again conducted under the format condition eased. In other words, the disk testing apparatus repeats the test until the disk apparatus gets a satisfactory result while gradually relaxing the format condition.

When the test result includes no unsatisfactory results in the test under the format condition initially set, or under the format condition eased, the disk apparatus is determined as the confirming item by the disk testing apparatus ("YES" at step S206). The disk apparatus is shipped as a product having specifications that correspond to a final format condition (step S207).

On the other hand, when the test result is still unsatisfactory even if the format condition is eased to a lowest grade, the disk apparatus is determined as the defective by the disk testing apparatus ("NO" at step S206). Such disk apparatus is diagnosed individually (step S208). If the disk apparatus is determined that a problem can be solved by replacing a part of the disk apparatus such as the head ("YES" at step S209), the part is replaced, and the disk apparatus is re-assemble with the part replaced (step S210). Then, the test is again conducted by the disk testing apparatus on the disk apparatus re-assembled. However, the disk apparatus that is determined to have a problem that cannot be solved even by replacing parts ("NO" at step S209) is discarded (step S211).

As described above, the disk testing apparatus does not simply lead to replacing the head (does not conduct the diagnosis at step S208) upon receiving the unsatisfactory result from an initial test. Instead, the disk testing apparatus repeats the test on the disk apparatus, after relaxing the format condition, under the format condition eased even if the test result is unsatisfactory for the format condition initially set. Therefore, even the head with the unsatisfactory result in the error rate test and the side erase test that are conducted under a high-grade format condition can be utilized under a low-grade format condition to be shipped. Furthermore, because the head is utilized in this manner, the test can be conducted again on the disk apparatus without replacing the head, or without re-assembling the disk apparatus. As a result, it is possible to prevent the head from unnecessarily discarded, and to reduce time and labor spent on the test before shipment.

FIG. 1 is a block diagram of a configuration of the disk testing apparatus according to the first embodiment. FIG. 4 is a table of information that is stored in a format-condition storage unit. FIG. 5 is a table of test details.

As shown in FIG. 1, a disk testing apparatus 10 includes an input unit 11, an output unit 12, a disk-control interface (I/F) unit 13, a storage unit 14, and a controller 15 that are connected through a predetermined bus. A disk apparatus 20 that is to be tested is connected to the disk testing apparatus 10 through a predetermined bus.

The input unit 11 includes an operation panel, a switch, and a button, and inputs various kinds of information. The input unit 11 inputs information accepted from an operator, such as the format condition that is initially set for the disk apparatus 20 (specifications of the disk apparatus expressed in the rank A, B, C, or D that corresponds to the rank of the head in the disk apparatus 20), and the threshold values that are used at the error rate test and the side erase test.

The output unit 12 includes a monitor (or, a display or an operation panel), a speaker, and a lamp, and outputs various kinds of information. The output unit 12 outputs, for example, a result of the disk test and the test result that is stored in a test-result storage unit 14b. The result of the disk test to be output includes a display that indicates a confirmed shipment and the specifications of the disk apparatus, or requirement of the diagnosis meaning that shipment is not confirmed.

The disk-control I/F unit 13 controls transmission of data between the disk testing apparatus and the disk apparatus 20. The disk-control I/F unit 13 controls transfer of control data and measurement data to and from the disk apparatus 20 at execution of the test by the controller 15. For example, the disk-control I/F unit 13 controls read and write of data into a predetermined area in the disk apparatus 20 in accordance with an instruction from the controller 15.

The storage unit 14 stores data and a program necessary for various processes by the controller 15. As shown in FIG. 1, the storage unit 14 includes a format-condition storage unit 14a and the test-result storage unit 14b as units that are important in the present invention.

The format-condition storage unit 14a stores information on the format condition set for the disk apparatus 20. Specifically, as shown in FIG. 4, the format-condition storage unit 14a stores the format condition that includes a combination of the BPI and the TPI for each of the specifications of the disk apparatus corresponding to the rank of the head. In an example shown in FIG. 4, each of the specifications A, B, C, and D has a different data storage capacity, for example, 40 gigabyte (GB), 35 GB, 30 GB, and 25 GB. Although the BPI and the TPI are shown in a degree of high or low in FIG. 4, the format-condition storage unit 14a stores values of the BPI and the TPI actually.

The test-result storage unit 14b stores information on the result of the test conducted on the disk apparatus 20. Specifically, the test-result storage unit 14b stores the result for each of test items (more specifically, the test items excluding "input of format condition of device specifications" and "tuning") shown in FIG. 5 indicating "OK" or "NG", and the measurement data (for example, the error rate and a time required to start the disk apparatus) that is obtained through the test.

The controller 15 includes a memory to store a program that prescribes various processes and control data. The controller 15 executes various processes with the program and the control data stored. As shown in FIG. 1, the controller 15 includes an initial condition-setting unit 15a, a testing unit 15b, a test-result determining unit 15c, a condition relaxing unit 15d, and a re-testing unit 15e as units that are important in the present invention. The initial condition-setting unit 15a corresponds to an "initial setting unit", the condition relaxing unit 15d corresponds to a "condition relaxing unit", and the re-testing unit 15e corresponds to a "re-testing unit" in the appended claims respectively.

The initial condition-setting unit 15a initially sets the format condition at the test for the disk apparatus 20. Specifically, when the rank (the device specifications A, B, C, or D) of the head installed in the disk apparatus 20 is input through the input unit 11, the initial condition-setting unit 15a reads the format condition (the BPI and the TPI) that corresponds to the device specifications from the format-condition storage unit 15a. Then, the initial condition-setting unit 15a writes the BPI and the TPI in the system area in the disk apparatus 20 through the disk-control I/F unit 13.

The testing unit 15b conducts the test on the disk apparatus 20 under the format condition set by the initial condition-setting unit 15a. Specifically, as show in FIG. 5, after reading the format condition for the disk apparatus 20 as a testing condition, the testing unit 15b accesses the disk unit 20 through the disk-control I/F unit 13, and then sequentially conducts the test of each of the test items according to a prescribed temperature and voltage. Upon obtaining the measurement data, such as the error rate and the time required to start the device, as a result of the test, the testing unit 15b derives the test result that indicates either "OK" or "NG" by comparing the measurement data with a predetermined threshold value. Then, the testing unit 15b stores the test result and the measurement data for each of the test items in the test-result storage unit 14b.

The test item includes an "oscillation selecting test" to examine whether there is a possibility in which operation of the disk apparatus 20 goes out of control due to oscillation of a frequency, a "write/read test" to examine whether an error occurs during writing and reading of data, a "load/unload test" to examine whether an error occurs when loading and unloading of the head between a ramp and a medium are repeated, and a "power ON/OFF test" to measure a time required to start the disk apparatus 20 and to examine whether the disk apparatus 20 starts within a predetermined time in addition to the "error rate test" and the "side erase test" described above.

The test-result determining unit 15c determines the result of the test conducted by the testing unit 15b and the result of the test re-conducted by the re-testing unit 15e. Specifically, the test-result determining unit 15c refers the test results ("OK" or "NG") stored in the test-result storage unit 14b, and judges whether all the test results are "OK". If not, the test-result determining unit 15c determines whether the test result of "NG" is only in the error rate test (and the side erase test), or only in the side erase test, or in the test of the test items other than the error rate test and the side erase test. When all the test results are "OK", the test-result determining unit 15c outputs information that indicates "shipment confirmed" and the "device specifications" from the output unit 12. When the test result of "NG" is found for the test items other than the error rate test and the side erase test, the test-result determining unit 15c outputs information that indicates "diagnosis required" from the output unit 12.

The condition relaxing unit 15d sets a new format condition by relaxing the format condition set for the disk apparatus 20. Specifically, the condition relaxing unit 15d refers the format condition stored in the format-condition storage unit 14a, and determines whether the format condition currently set can be eased. More specifically, when only the test result in the error rate test (and the side erase test) is "NG", the condition relaxing unit 15d determines whether the BPI can be lowered. When only the test result of the side erase test is "NG", the condition relaxing unit 15d determines whether the TPI can be lowered. In the example shown in FIG. 4, for the format condition for the device specifications A or C, the BPI can be lowered, and for the format condition for the device specifications A or B, the TPI can be lowered.

When the BPI is to be lowered, the condition relaxing unit 15d reads a format condition with the BPI that is one rank lower than the BPI in the format condition currently set from among the format conditions stored in the format-condition storage unit 14a, and writes the format condition read in the system area in the disk apparatus 20. When the TPI is to be lowered, the condition relaxing unit 15d reads a format condition with the TPI that is one rank lower than the TPI in the format condition currently set to write in the system area. On the other hand, if the format condition cannot be eased, the information that indicates "diagnosis required" is output from the output unit 12. A reason why the BPI has precedence when relaxing the format condition is because if the error rate is decreased by lowering the BPI, side-erase resistance of the disk apparatus 20 also improves.

The re-testing unit 15e re-conducts the test on the disk apparatus 20 under the format condition eased by the condition relaxing unit 15d. Specifically, similarly to the testing unit 15c, the re-testing unit 15e conducts the tests of the test items shown in FIG. 5 under the format condition eased, excluding the tests of the test items that are not affected by the relaxing of the format condition.

The test items that can be excluded include the oscillation selecting test and the load/unload test. In addition, the power ON/OFF test may also be excluded at the test conducted by the re-testing unit 15e if a certain condition is satisfied, in which the format condition that is applied in the system area is set in a fixed value. In other words, although the time required to start the disk apparatus 20 that is measured in the power ON/OFF test is a time required to read information on the disk apparatus 20, such as the format condition, from the system area in the disk apparatus 20 after turning on a power of the disk apparatus 20, if the BPI and the TPI applied in the system area are always set and fixed at a lowest value so that the BPI and the TPI in the system area cannot be changed even by the condition relaxing unit 15d, the time required to start the disk apparatus 20 is not affected by the relaxing of the format condition. Thus, the power ON/OFF test can also be excluded in the test conducted by the re-testing unit 15e.

FIG. 6 is a flowchart of the disk test according to the first embodiment. The disk test is explained supposing that the head test, ranking of the head, and the assembly of the disk apparatus, which are shown in FIG. 2, have already been completed preceding the disk test.

As shown in FIG. 6, the disk apparatus 20, which is a test target, is set to the disk testing apparatus 10 ("YES" at step S601). When the rank (the device specifications A, B, C, or D) of the head installed in the disk apparatus 20 is input through the input unit 11 ("YES" at step S602), the initial condition-setting unit 15a sets an initial format condition for the disk apparatus 20 (step S603). In other words, the initial condition-setting unit 15a reads the format condition (the BPI and the TPI) that corresponds to the device specifications from the format-condition storage unit 14a (see FIG. 4), and writes the BPI and the TPI in the system area in the disk apparatus 20 through the disk-control I/F unit 13.

Then, the testing unit 15b conducts the test on the disk apparatus 20 under the format condition set at step S603, and stores the result of the test in the test-result storage unit 14b (step S604). Specifically, after reading the format condition set for the disk apparatus 20 as the testing condition, the testing unit 15b accesses the disk apparatus 20 through the disk-control I/F unit 13, and then sequentially conducts the test of each of the test items according to the prescribed temperature and voltage. Upon obtaining the measurement data, such as the error rate and the time required to start the device, as a result of the test, the testing unit 15b derives the test result that indicates either "OK" or "NG" by comparing the measurement data with the predetermined threshold value. Then, the testing unit 15b stores the test result and the measurement data for each of the test items in the test-result storage unit 14b.

The test-result determining unit 15c refers the test results ("OK" or "NG") stored in the test-result storage unit 14b, and judges whether all the test results are "OK" (step S605). When all the test results are "OK" ("YES" at step S605), the test-result determining unit 15c outputs the information that indicates "shipment confirmed" and the "device specifications" from the output unit 12 (step S606), and the process is completed. The "device specifications" output is the device specifications (see FIG. 4) that corresponds to the format condition initially set for the disk apparatus 20 if determination at step S605 is determination that is made for the first time.

On the other hand, the test result includes the result of "NG" ("NO" at step S605), the test-result determining unit 15c refers the test results stored in the test-result storage unit 14b, and determines whether the test result of "NG" is only in the error rate test (or in both the error rate test and the side erase test) (step S607). If the test result of "NG" is not only in the error rate test (and the side erase test) ("NO" at stet S607), the test-result determining unit 15c determines whether test result of "NG" is only in the side erase test (step S611). When the test result of "NG" is found for the test items other than the error rate test and the side erase test, the test-result determining unit 15c outputs the information that indicates "diagnosis required" from the output unit 12, and the process is finished (step S614).

When it is determined that only the test result in the error rate test (and the side erase test) is "NG" ("YES" at step S607), the condition relaxing unit 15d refers the format condition stored in the format-condition storage unit 14a, and determines whether the BPI in the format condition currently set can be lowered (step S608). In the example shown in FIG. 4, if the format condition is set for the device specifications A or C, the BPI can be lowered.

When it is determined that only the test result in the side erase test is "NG" ("YES" at step S611), the condition relaxing unit 15d refers the format condition, and determines whether the TPI in the format condition currently set can be lowered (step S612). In the example shown in FIG. 4, if the format condition is set for the device specifications A or B, the TPI can be lowered.

When it is determined that the BPI and the TPI cannot be lowered to ease the format condition ("NO" at steps S608 and S612), the condition relaxing unit 15d outputs the information that indicates "diagnosis required" from the output unit 12 (step S614), and the process is finished. On the other hand, when it is determined that the BPI can be lowered ("YES" at step S608), the condition relaxing unit 15d re-set the format condition with a lowered BPI for the disk apparatus 20 (step S609). In other words, the condition relaxing unit 15d reads the format condition with the BPI that is one rank lower than the BPI in the format condition currently set from among the format conditions stored in the format-condition storage unit 14a (see FIG. 4), and writes the format condition read in the system area in the disk apparatus 20.

Similarly, when it is determined that the TPI can be lowered ("YES" at step S612), the condition relaxing unit 15d re-set the format condition with a lowered TPI for the disk apparatus 20 (step S613). In other words, the condition relaxing unit 15d reads the format condition with the TPI that is one rank lower than the TPI in the format condition currently set from the format-condition storage unit 14a (see FIG. 4), and write the format condition read in the system area in the disk apparatus 20.

After thus relaxing the format condition (steps S609 or S613), the re-testing unit 15e re-conducts the test on the disk apparatus 20 for which the format condition eased is set, and store the test result in the test-result storage unit 14b (step S610). Specifically, although, as the test conducted at step S604, the tests of the test items shown in FIG. 5 are conducted under a new eased format condition, the tests for the test items (the oscillation selecting test, the load/unload test, the power ON/OFF test) that are not affected by the relaxing of the format condition are excluded.

When the test is re-conducted, the process returns to step S605, and the test-result determining unit 15c refers the test results ("OK" or "NG") stored in the test-result storage unit 14b, and judges whether all the test results are "OK" (step S605). When all the test results are "OK" ("YES" at step S605), the test-result determining unit 15c outputs the information that indicates "shipment confirmed" and the "device specifications" from the output unit 12 (step S606), and the process is completed. The "device specifications" output is the device specifications (see FIG. 4) that corresponds to the format condition re-set for the disk apparatus 20 at step S609 or S613.

If the test result of "NG" is still included in the test result after re-conducting the test ("NO" at step S605), the process at step 607 is performed as at the test first conducted. The processes at steps S607 to S614 and step S605 are repeated. In other words, the disk testing apparatus 10 repeats the test while sequentially relaxing the format condition the results of all the test items become satisfactory, or until the format condition becomes impossible to be eased any further.

FIG. 7 is a flowchart of the disk test in a specific example according to the first embodiment. The disk test that is conducted on the disk apparatus 20 in which the head ranked A (the device specifications A) shown in FIG. 4 is installed is explained.

As shown in FIG. 7, the disk testing apparatus 10 sets the format condition (BPI: high, TPI: high) that corresponds to the device specifications A for the disk apparatus 20 in which the head ranked A is installed (step S701). The disk testing apparatus 10 conducts the test under such format condition. Then, when all the test results are "OK" ("YES" at step S702), the disk testing apparatus 10 determines that the disk apparatus 20, which is the test target, is possible to be shipped as a product having the device specifications A ("YES" at step S703), and the disk test is finished.

When the test result of "NG" is included ("NO" at step S702) in the test result but only in the error rate test (and the side erase test) ("YES" at step S704), the disk testing apparatus 10 re-set the format condition (BPI: low, TPI: high) that corresponds to the device specifications B for the disk apparatus 20, lowering the BPI only for one rank (step S705).

When only the test result in the side erase test is "NG" ("NO" at step S704 and "YES" at step S708), the disk testing apparatus 10 re-set the format condition (BPI: high, TPI: low) that corresponds to the device specifications C for the disk apparatus 20, lowering the TPI only for one rank (step S709). However, if the test results are "NG" in the test other than the error rate test and the side erase test ("NO" at steps S704 and S708), the disk testing apparatus 10 determines that the disk apparatus 20 requires to be diagnosed (step S712), and the disk test is finished.

The disk testing apparatus 10 re-conducts the test on the disk apparatus 20 under the format condition (BPI: low, TPI: high) re-set at step S705. When all the test results become "OK" as a result of re-conducting the test with the format condition re-set ("YES" at step S706), the disk testing apparatus 10 determines that the disk apparatus 20 is possible to be shipped as a product having the device specifications B (step S707), and the disk test is finished.

Similarly, the disk testing apparatus 10 re-conduct the test on the disk apparatus 20 under the format condition (BPI: high, TPI: low) re-set at step S709. When all the test results become "OK" as a result of re-conducting the test with the format condition re-set ("YES" at step S710), the disk testing apparatus 10 determines that the disk apparatus 20 is possible to be shipped as a product having the device specifications C (step S711), and the disk test is finished.

When the test result of "NG" is included in the test result of the test conducted under the format condition (BPI: low, TPI: high) that corresponds to the device specifications B ("NO" at step S706), and when the test result of "NG" is in the error rate test (and the side erase test) ("YES" at step S713), the disk testing apparatus 10 determines that the disk apparatus 20 requires to be diagnosed (step S714) since the BPI cannot be lowered any further, and the disk test is finished. Moreover, when the test result is "NG" in the test of the test items other than the error rate test and the side erase test ("NO" at step S715), the disk testing apparatus 10 determines that the disk apparatus 20 requires to be diagnosed (step S716), and the disk test is finished.

On the other hand, when the test result of "NG" is included in the test result of the test conducted under the format condition (BPI: low, TPI: high) that corresponds to the device specifications B ("NO" at step S706) but only in the side erase test ("NO" at step S713 and "YES" at step S715), the disk testing apparatus 10 re-sets the format condition (BPI: low, TPI: low) that corresponds to the device specifications D for the disk apparatus 20, lowering the TPI for only one rank (step S717).

Referring back to step S710, when the test result of "NG" is included in the test result conducted under the format condition (BPI: high, TPI: low) that corresponds to the device specifications C ("NO" at step S710) but only in the error rate test (and the side erase test) ("YES" at step S721), the disk testing apparatus 10 re-sets the format condition (BPI: low, TPI: low) that corresponds to the device specifications D for the disk apparatus 20, lowering the BPI for only one rank (step S717).

When the test result of "NG" is included in the test result conducted under the format condition (BPI: high, TPI: low) that corresponds to the device specifications C ("NO" at step S710), and the test result of "NG" is in the side erase test ("NO" at step S721 and "YES" at step S722), the disk testing apparatus 10 determines that the disk apparatus 20 requires to be diagnosed (step S723), since the TPI cannot be lowered any further (see FIG. 4), and the disk test is finished. Moreover, when the test result is "NG" in the test of the test item other than the error rate test and the side erase test ("NO" at step S722), the disk testing apparatus 10 determines that the disk apparatus 20 requires to be diagnosed (step S724), and the disk test is finished.

Furthermore, when the test result of "NG" is included in the test conducted under the format condition (BPI: low, TPI: low) that corresponds to the device specifications D ("NO" at step S718), the disk testing apparatus 10 determines that the disk apparatus 20 requires to be diagnosed (step S720) since neither the BPI nor the TPI can be lowered any further (see FIG. 4), and the disk test is finished.

As described above, according to the first embodiment, even when the test result in the error rate test or the side erase test that are conducted under the format condition (the BPI and the TPI) initially set is unsatisfactory, the new format condition is set by relaxing the format condition, and the test is re-conducted under the new format condition, not just replacing the head. Therefore, even the head that is used in the disk apparatus that receives the unsatisfactory result in the error rate test or the side erase test under the severe format condition set for high specifications can be utilized and shipped by relaxing the format condition. As a result, it is possible to prevent the head from unnecessarily being discarded, thereby contributing to reducing the manufacturing cost of the disk apparatus 20.

Moreover, as a result of utilizing such head, the test can be re-conducted without replacing the head and without re-assembling the disk apparatus. Therefore, it is possible to reduce the time and labor spent on the test before shipment, thereby contributing to the mass production of the disk apparatus 20.

Furthermore, according to the first embodiment, the BPI is lowered to deal with the unsatisfactory result in the error rate test. Therefore, it is possible to effectively reduce the error rate. On the other hand, the TPI is lowered to deal with the unsatisfactory result in the side erase test. Therefore, it is possible to effectively reduce the possibility of occurrence of the side erase. In addition, if the test results are unsatisfactory in both the error rate test and the side erase test, the BPI has the precedence to be lowered. Therefore, it is possible not only to reduce the error rate, but also to improve the side-erase resistance by thus reducing the error rate.

Moreover, according to the first embodiment, the format condition that is initially set is not always the format condition for the highest specifications (for example, the device specifications A shown in FIG. 4) among a plurality of the format conditions, but the format condition that corresponds to the result of the head test that is conducted in advance (for example, the device specifications B shown in FIG. 4 if the head rank is B). Therefore, it is possible to efficiently set the format condition likely to correspond to the head, thereby reducing the time spent on the test before shipment, compared to when the test is conducted starting from the format condition for the highest specifications.

Furthermore, according to the first embodiment, when the test is re-conducted, the tests of the test items (for example, the oscillation selecting test, the load/unload test, and the power ON/OFF test) that are not affected by the relaxing of the format condition are excluded. Therefore, it is possible to reduce the time required for re-conducting the test, thereby reducing the time spent on the test before shipment.

The disk testing apparatus 10 according to the first embodiment has been explained. However, the present invention may be applied in various other embodiments. A disk testing apparatus according to a second embodiment of the present invention will be explained below.

While a case in which the format conditions are prepared that are formed with a combination of the BPI and the TPI selected from among two kinds of the BPI and the TPI, which are "high" and "low" respectively, has been explained in the first embodiment, the present invention is not limited to this case. For example, the format conditions that include combinations that are formed of the BPI and the TPI selected from among three or more kinds of the BPI and the TPI respectively may be stored in the format-condition storage unit, as shown in FIG. 8. If the format conditions that are subdivided into a plurality of degrees are available, it is possible to ease the format condition little by little, thereby enabling to prevent a storage capacity of the disk apparatus 20 from being degraded more than necessary.

Moreover, while a case in which a rank of the BPI or the TPI is lowered one by one to ease the format condition has been explained in the first embodiment, the present invention is not limited to this case. The BPI and the TPI may be lowered by more than one rank at one time depending on a degree of a defect. In other words, in the example shown in FIG. 8, if the result of the error rate test conducted under the format condition for the device specifications A is extremely unfavorable, the format condition may be re-set for the specifications C instead of re-setting the format condition for the specifications B that has the BPI lowered for just one rank from the BPI included in the format condition currently set.

Thus, if the format condition is eased by degrading for one rank or more depending on the degree of the defect, instead of relaxing the format condition by always degrading the format condition only for one rank from the format condition currently set, it is possible to efficiently set the format condition for one suitable for the head when the test is re-conducted. Therefore, it is possible to reduce the time spent on the test before shipment compared to when the test is repeated while relaxing the format condition one by one.

Furthermore, while a case in which the BPI has the precedence to be lowered when the result is unsatisfactory not only in the error rate test but also in the side erase test has been explained in the first embodiment, the present invention is not limited to this case. Both the BPI and the TPI may be lowered to ease the format condition. However, in terms of preventing the storage capacity of the disk apparatus 20 from being degraded more than necessary, it is preferable that the BPI is precedently lowered, because the side-erase resistance of the disk apparatus improves if the error rate is decreased by lowering the BPI.

Moreover, while a case in which the TPI is lowered to ease the format condition when only the result of the side erase test is "NG" has been explained, the present invention is not limited to this case. Both the TPI and the BPI may be lowered, or only the BPI may be lowered because by lowering the BPI, it is possible to reduce not only the error rate but also the side erase while by lowering the TPI, it is possible to reduce only the side erase.

Furthermore, while a case in which it is determined whether the TPI can be lowered when only the result of the side erase test is "NG" has been explained in the first embodiment, the present invention is not limited to this case. The BPI may be lowered even if the TPI cannot be lowered any further by constructively determining whether the BPI can be lowered. In other words, in the example shown in FIG. 4, when only the result of the side erase test is "NG" among the test items of the test conducted under the format condition for the specifications C, the format condition, in which the BPI is lowered, for the specifications D may be set, instead of giving up of relaxing the format condition.

Moreover, while a case in which both the error rate test and the side erase test are conducted has been explained in the first embodiment, the present invention is not limited to this case. The present invention may be applied to other cases in which only either one of the error rate test and the side erase test is conducted, or in which one or more than one of other tests relating to readout of the data (tests of which results can be improved by relaxing the condition of the recording density, such as the BPI and the TPI) are conducted.

While a case in which the head is ranked in advance, and the format condition that corresponds to the rank of the head is initially set for the disk apparatus 20 has been explained in the first embodiment, the present invention is not limited to this case. The format condition may be set for the highest specifications (for example, the device specifications A shown in FIG. 4) first without ranking the head, and the test may be conducted always starting from the format condition for the highest specifications. Thus, the work for ranking the head becomes unnecessary; however, in terms of lightening a processing load on the disk testing apparatus 20, it is preferable that the head is ranked in advance.

While a case in which the test is conducted on a single unit of the disk apparatus 20 (see FIG. 1) has been explained in the first embodiment, the present invention is not limited this case. More than one unit of the disk apparatus 20 may be set to the disk testing apparatus 10 to simultaneously conduct the test on the disk apparatuses 20. In this case, the device specifications that corresponds to the head in each of the disk apparatuses 20 is input through the input unit 11, and the information that indicates "shipment confirmed" or "diagnosis required" is output through the output unit 12 for each of the disk apparatuses 20.

Each of components of the disk testing apparatus 10 shown in FIG. 1 is to explain a functional concept, and it is not necessary to physically configure the disk testing apparatus 10 as shown in FIG. 1. In other words, a specific configuration in distributing or integrating the components of the disk testing apparatus 10 is not limited to the one shown in FIG. 1. For example, the initial condition-setting unit 15a and the condition relaxing unit 15d may be integrated, the testing unit 15b and the re-testing unit 15e may be integrated, or the test-result determining unit 15c may be distributed for each of determining items. Thus, all or a part of the components maybe structured by functionally or physically distributing or integrating the components in an arbitrary unit. Furthermore, each function performed by each of the devices may be wholly or partially realized by the CPU and a computer program that is executed by the CPU, or maybe realized as hardware by a wired logic.

Various processes explained in the first embodiment can be realized by executing a computer program that is prepared in advance. FIG. 9 is a block diagram of a computer on which a disk testing program is executed.

As shown FIG. 9, a computer 30 as the disk testing apparatus includes an operation panel 31, a display 32, a speaker 33, a disk-control I/F unit 34, an a hard disk drive (HDD) 35, a random access memory (RAM) 36, a read-only memory (ROM) 37, and a central processing unit (CPU) 38 that are connected through a bus 39. The operation panel 31 corresponds to the input unit 11 shown in FIG. 1, the display 32 and the speaker 33 correspond to the output unit 12, and the disk-control I/F unit 34 corresponds to the disk-control I/F unit 13.

The ROM 37 stores the disk testing program that realizes the same functions explained in the first embodiment. As shown in FIG. 9, an initial condition-setting program 37a, a testing program 37b, a test-result determining program 37c, a condition relaxing program 37d, and a re-testing program 37e are stored in the ROM 37 in advance. Each of the initial condition-setting programs 37a, the testing program 37b, the test-result determining program 37c, the condition relaxing program 37d, and the re-testing program 37e may be integrated or distributed as required, similarly to each of the components of the disk testing apparatus 10 shown in FIG. 1.

The CPU 38 reads and the programs 37a to 37e from the ROM 37, and executes the programs 37a to 37e. As shown in FIG. 9, each of the initial condition-setting programs 37a, the testing program 37b, the test-result determining program 37c, the condition relaxing program 37d, and the re-testing program 37e functions as an initial condition-setting process 38a, a testing process 38b, a test-result determining process 38c, a condition relaxing process 38d, and a re-testing process 38e respectively. Each of the initial condition-setting process 38a, the testing process 38b, the test-result determining process 38c, the condition relaxing process 38d, and the re-testing process 38e corresponds to the initial condition-setting unit 15a, the testing unit 15b, the test-result determining unit 15c, the condition relaxing unit 15d, and the re-testing unit 15e respectively.

The HDD 35 includes a format condition table 35a and a test result table 35b. The format condition table 35a and the test result table 35b correspond to the format-condition storage unit 14a and the test-result storage unit 14b shown in FIG. 1 respectively. The CPU 38 registers the test results in the test result table 35b. The CPU 38 reads format condition data 36a and test result data 36b from the format condition table 35a and the test result table 35b, and stores the format condition data 36a and the test result data 36b read in the RAM 36. The CPU 38 executes the test and determination of the test results based on the format condition data 36a and the test result data 36b in the RAM 36.

Each of the programs 37a to 37e is not necessarily stored in the ROM 37 from the beginning. The programs 37a to 37e may be stored in, for example, a flexible disk (FD), a compact disk read only memory (CD-ROM), a magneto-optical (MO) disk, a digital versatile disk (DVD), a "conveyable physical medium" such as an integrated circuit (IC) card, a "fixed physical medium" such as an HDD that is installed inside or outside of the computer 30, or "another computer (or a sever)" that is connected to the computer 30 through a public line, the Internet, a local area network (LAN), or a wide area network (WAN). Each of the programs 37a to 37e may be executed by the computer 30 by reading from such locations.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A disk testing apparatus that sets a predetermined condition of a recording density for a disk apparatus, and conducts a test relating to at least readout of data stored in the disk apparatus, the disk testing apparatus comprising:
a condition relaxing unit that relaxes, when a result of the test is unsatisfactory, a condition of the recording density currently set for the disk apparatus to set a new condition of the recording density; and
a re-testing unit that re-conducts the test on the disk apparatus to which the new condition is set,
wherein the test includes at least one of an error rate test and a side erase test, and
the condition relaxing unit relaxes the condition of a recording density:
in a direction of circumference of a disk, when the result of the test is unsatisfactory only in the error rate test;
in a direction of radius of the disk, when the result of the test is unsatisfactory only in the side erase test; and
in the direction of circumference of the disk, when the result of the test is unsatisfactory in both the error rate test and the side erase test.

2. The disk testing apparatus according to claim 1, wherein the condition relaxing unit relaxes the condition of the recording density depending on a degree of being unsatisfactory in the result of the test.

3. The disk testing apparatus according to claim 1, further comprising:
an initial setting unit that initially sets the predetermined condition of the recording density for the disk apparatus upon the disk testing apparatus starting the test; and
a head testing unit that conducts a head test for the disk testing apparatus, wherein
the initial setting unit sets the predetermined condition based on a result of the head test that has been conducted on a head of the disk apparatus in advance.

4. The disk testing apparatus according to claim 1, wherein the re-testing unit excludes, when re-conducting the test, a test item that is not affected by relaxing the condition of the recording density.

5. A disk testing method of setting a predetermined condition of a recording density for a disk apparatus, and conducting a test relating to at least readout of data stored in the disk apparatus, the disk testing method comprising:
setting initially the predetermined condition of the recording density for the disk apparatus;
conducting the test on the disk apparatus to which the predetermined condition is set;
relaxing, when a result of the test is unsatisfactory, a condition of the recording density currently set for the disk apparatus to set a new condition of the recording density; and
re-conducting the test on the disk apparatus to which the new condition is set,
wherein the test includes at least one of an error rate test and a side erase test, and
the relaxing includes relaxing the condition of a recording density:
in a direction of circumference of a disk, when the result of the test is unsatisfactory only in the error rate test;
in a direction of radius of the disk, when the result of the test is unsatisfactory only in the side erase test; and
in the direction of circumference of the disk, when the result of the test is unsatisfactory in both the error rate test and the side erase test.

6. A computer-readable recording medium that stores a disk testing program for setting a predetermined condition of a recording density for a disk apparatus, and conducting a test relating to at least readout of data stored in the disk apparatus, wherein the disk testing program makes a computer execute
relaxing, when a result of the test is unsatisfactory, a condition of the recording density currently set for the disk apparatus to set a new condition of the recording density; and
re-conducting the test on the disk apparatus to which the new condition is set,
wherein the test includes at least one of an error rate test and a side erase test, and
the condition relaxing unit relaxes the condition of a recording density:
in a direction of circumference of a disk, when the result of the test is unsatisfactory only in the error rate test;
in a direction of radius of the disk, when the result of the test is unsatisfactory only in the side erase test; and
in the direction of circumference of the disk, when the result of the test is unsatisfactory in both the error rate test and the side erase test.

7. A disk apparatus on which a test relating to at least readout of data stored in the disk apparatus is conducted under a predetermined condition of a recording density set for the disk apparatus, wherein
when a result of the test is unsatisfactory, a condition of the recording density currently set for the disk apparatus is relaxed to set a new condition of the recording density,
the test is re-conducted on the disk apparatus under the new condition,
the test includes at least one of an error rate test and a side erase test, and
the condition of a recording density is relaxed:
in a direction of circumference of a disk, when the result of the test is unsatisfactory only in the error rate test;
in a direction of radius of the disk, when the result of the test is unsatisfactory only in the side erase test; and
in the direction of circumference of the disk, when the result of the test is unsatisfactory in both the error rate test and the side erase test.

* * * * *